United States Patent
Feichtinger

[11] Patent Number: 5,806,201
[45] Date of Patent: Sep. 15, 1998

[54] MULTI-COORDINATE TOUCH PROBE

[75] Inventor: Kurt Feichtinger, Palling, Germany

[73] Assignee: Johannes Heidenhain GmbH, Traunreut, Germany

[21] Appl. No.: 613,561

[22] Filed: Mar. 8, 1996

[30] Foreign Application Priority Data

Mar. 10, 1995 [EP] European Pat. Off. ............. 95103461

[51] Int. Cl.⁶ .................................................. G01B 5/012
[52] U.S. Cl. ................................................ 33/561; 33/556
[58] Field of Search ............................ 33/503, 561, 559, 33/556, 558

[56] References Cited

U.S. PATENT DOCUMENTS

| 5,090,131 | 2/1992 | Deer ............................................. 33/561 |
| 5,111,592 | 5/1992 | Aehnelt et al. ............................. 33/561 |
| 5,657,549 | 8/1997 | Shen et al. ................................. 33/561 |

FOREIGN PATENT DOCUMENTS

| 0361164 | 4/1990 | European Pat. Off. . |
| 0438095 | 7/1991 | European Pat. Off. . |
| 0439296 | 7/1991 | European Pat. Off. . |
| 0506306 | 9/1992 | European Pat. Off. . |
| 0598709 | 5/1994 | European Pat. Off. . |
| 2347633 | 4/1974 | Germany . |
| 3508396 | 3/1985 | Germany . |
| 8907745 | 8/1989 | WIPO . |

OTHER PUBLICATIONS

Modjarrad, A.; and Hajdukiewicz, P, Development of a Small Novel 3–Dimensional High Accuracy Probe for CMMs, Quality Europe No.1, 26–30 (1991).

Weckenmann, Von A.; Goch, G.; and Springborn, H.D., Korrektur der Taststiftbiegung bei Messungen mit Mehrk-oordinaten–Messgeräten, Feinwerktechnik & Messtechnik, 87, No. 1, 5–9 (1979).

*Primary Examiner*—Thomas B. Will
*Attorney, Agent, or Firm*—Anderson, Kill & Olick, P.C.

[57] ABSTRACT

A multi-coordinate touch probe including a deflectable stylus, a stylus support, and a sensor arrangement for sensing the deflection of the stylus and for generating a deflection signal, with the deformation parameters of the assembly stylus/support, which include a geometrical layout of the support, a geometrical shape of the stylus, and properties of a stylus material, being so selected that a noticeable scanning direction-dependent characteristic is eliminated.

3 Claims, 3 Drawing Sheets

MULTI-COORDINATE TOUCH PROBE

BACKGROUND OF THE INVENTION

The present invention relates to a multi-coordinate touch probe for measuring an object and including a stylus having a free end for scanning the object, with the stylus having a zero position, in which the stylus is retained by a resetting force, and deflectable from its zero position dependent on a shape of the measuring object, a support for supporting the stylus, and a sensor arrangement located at an end of the stylus which is opposite to the free end of the stylus for sensing deflection of the stylus from its zero position and for generating a deflection signal.

Multi-coordinate touch probes are disclosed in a plurality of references. Every multi-coordinated probe includes sensor means which, upon scanning of an object, provides a scanning signal. Different types of sensor means are used for generating scanning signals in a touch probe. The sensing means can be formed, e.g, as an electrical switch, photo-electrical measuring system, or as a position sensor. Different types of sensor means are disclosed in German patents Nos. 2,347,633; 3,508,396 and European Publication EP-0-361 164 A1.

During scanning of an object with a touch probe, the object, dependent on its shape, deflects the probe stylus which contacts the object with its tracer tip. Dependent on the design of the stylus support and the sensor means, a scanning signal is generated upon smaller or greater stylus deflection.

This results in an uncertainty of a measurement. Among other numerous factors, the bending of the stylus plays a large role. The bending of the stylus primarily depends on the measuring pressure which is determined by the stylus support.

The experiments showed that the measuring pressure depends on the stylus geometry and bending, i.e., it changes with the changing geometry of the stylus and stylus bending characteristics. This again results in smaller or greater deviations of the measurement.

There exists a linear relationship between the stylus bending and the measuring pressure. This relationship is defined by a well-known equation from strength of material for a beam fixed only at one end:

$$f = F \cdot \frac{6U}{3\pi E} \cdot \frac{T_L^3}{T_D^4}, \text{ where}$$

f—is deflection,
F—is pressure force
E—module of elasticity,
$T_L$—tension length (stylus length),
$T_D$—stylus diameter Accordingly, an object of the invention is a touch probe in which the measurement error attributed to the stylus bending is reduced to an extent that it becomes negligibly small.

SUMMARY OF THE INVENTION

This and other objects of the invention, which will become apparent hereinafter, are achieved by so selecting the deformation parameters of the stylus/support means assembly, i.e. the geometrical layout of the support means, the geometrical shape of the stylus, and the stylus material, that a noticeable scanning direction-dependent characteristic is eliminated.

The particular advantage of the touch probe according to the present invention consists in its simple construction, which also insures compensation of the scanning direction-dependent error.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENT

Figure 1:
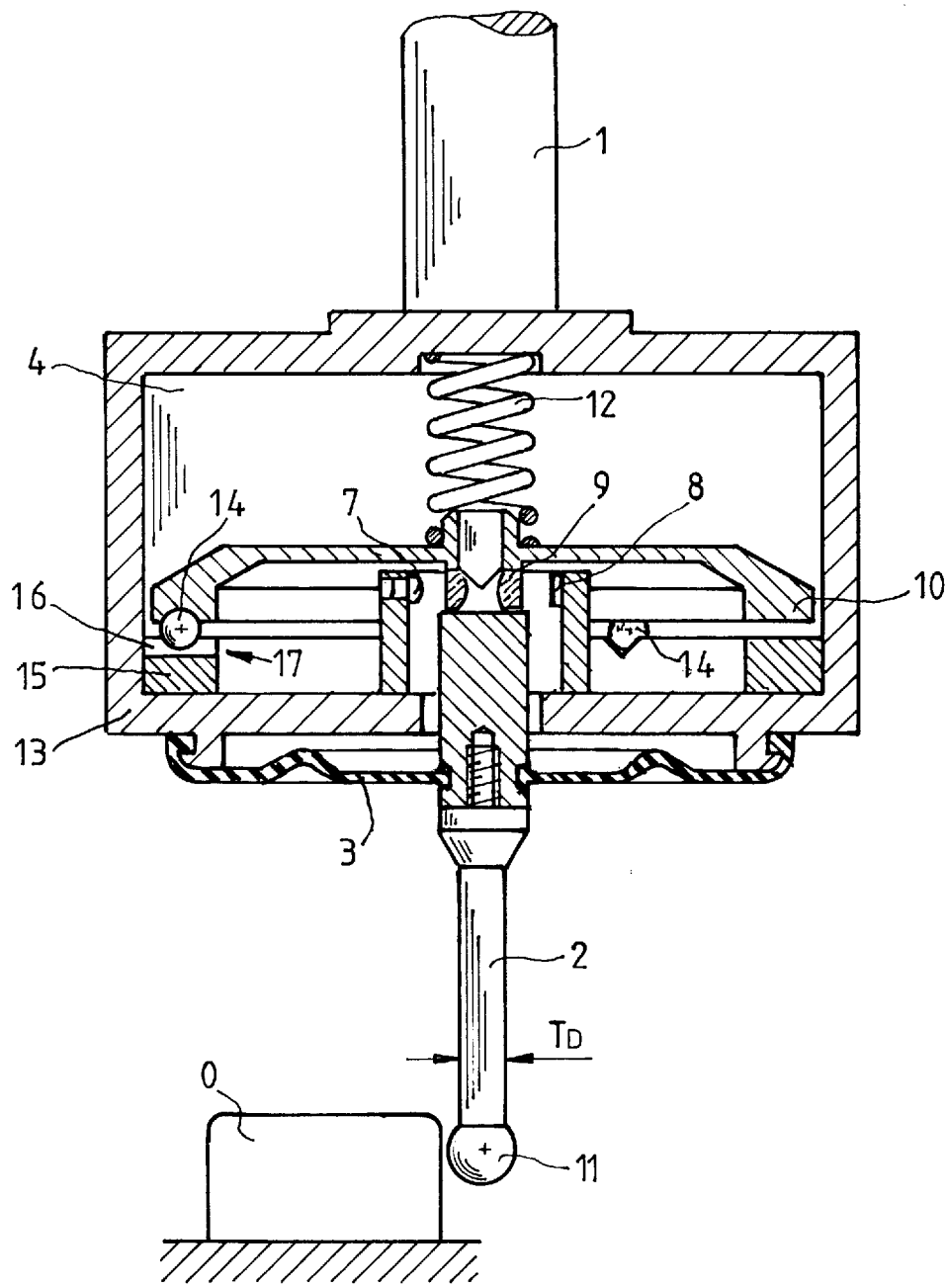
FIG. 1 is a cross-sectional view of a multi-coordinate touch probe according to the present invention.

FIG. 1 shows a principle construction of a multi-coordinate touch probe according to the present invention. The touch probe shown in FIG. 1 is formed as a replaceable probe. The touch probe has a shaft 1 with which the probe can be inserted in a spindle of a measuring machine or a machine tool (not shown). The deflection of the stylus 2 is possible in any direction. The sealing 3 closes the space between the probe housing 4 and the upper portion of the stylus 2. A sensing device 7, 8, 9, which senses or detects the deflection of the stylus 2, generates, at a predetermined deflection magnitude of the stylus 2, a signal which is used for controlling, e.g., a machine-tool or for determining the time of taking the measurement in a multi-coordinate measuring machine, or for any other appropriate purpose. The sensing device 7, 8, 9 includes an optical transmitter 7, which is fixedly secured in the probe housing 4, and a likewise fixedly secured differential photoelement 8, which is aligned with the optical transmitter 7. A lens system 9 is located in the common optical axis of the optical transmitter 7 and the photoelement 8. The lens system 9 is fixedly secured on the stylus 2.

The stylus 2 is fixedly connected to the measuring plate 10. At its free end, the stylus 2 is provided with a tracer tip 11. A spring 12 connects the measuring plate 10 with the probe housing 4. A surface of the measuring plate, which is located opposite to the spring-engaged surface of the measuring plate 10, forms a part of support means that supports the measuring plate 10 on the bottom 13 of the probe housing 4. The support of the measuring plate 10 on the probe housing bottom 13 should be executed very precisely to avoid any statistical underestimation or overestimation of a measuring error.

During the process of measuring the workpiece O, the measuring plate 10 is held by the spring 12 in its initial, i.e., zero-position in which the force of the spring 12 counteracts the contact pressure of the tracer tip 11 on the workpiece O, and prevents the measuring plate 10 from being lifted or swung from its initial position when the contact force acting on the measuring plate 10 is below a predetermined value. As long as the measuring plate is held by the spring 12 against the probe housing bottom 13, the measuring plate 10 and the probe housing 4 form a unitary assembly having a zero degree of freedom. After the deflection of the stylus 2 stops, the spring 12 is so loaded that it displaces the measuring plate 10 back to its initial position relative to the probe housing bottom 13.

The support of the measuring plate 10 is formed as a multi-point support. In the embodiment shown in FIG. 1, a three-point support is provided. The support points are uniformly distributed along the circumference of the measuring plate 10 and are defined by balls 14 arranged in a common plane and anchored fixedly in the measuring plate 10. A suitable counter support members are provided in the probe housing 4. In the embodiment shown in FIG. 1, the counter support is formed by a prism 15 having a V-shaped groove 16. The measuring plate 10, the balls 14 and the prisms 15 define together the support 17 for the stylus 2.

The prisms 15 are so arranged that their V-shaped groove 16 is located transverse to the longitudinal axis of the stylus 2 when the stylus 2 is in its zero rest position. With this arrangement of the prisms 15, the balls 14 are properly positioned in the associated grooves 16.

Figure 2:
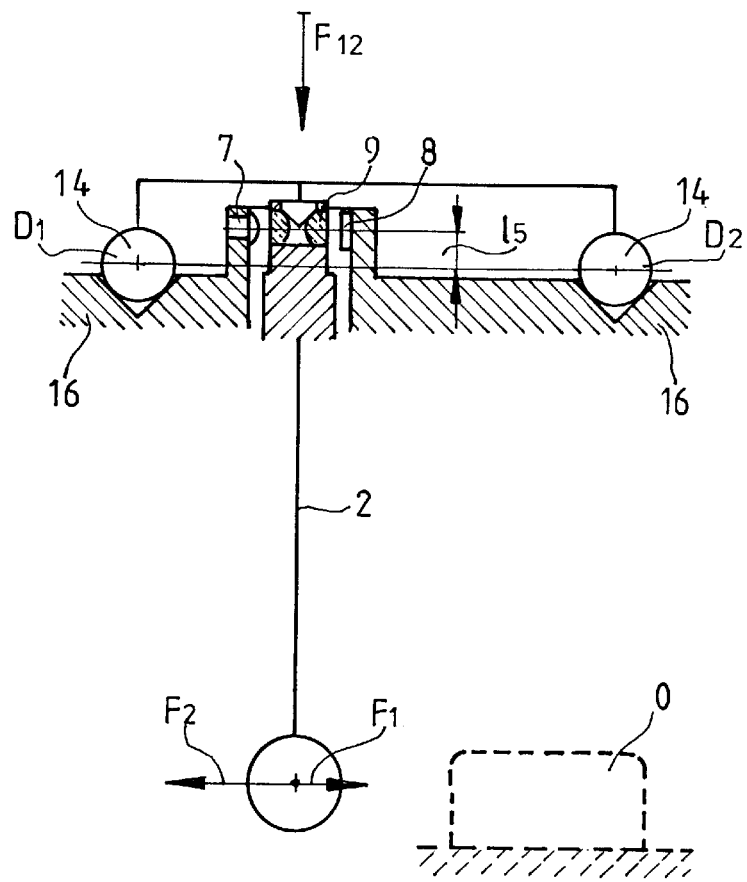
FIG. 2 is a principle diagram of a multi-coordinate touch probe according to the present invention.

FIG. 2 shows a principle diagram of the touch probe according to the present invention shown in FIG. 1. FIG. 2 shows geometrical relationships of a multi-coordinate touch probe having three support points.

Multi-coordinate touch probes with three support points are statically determined and can be easily manufactured. However, they are characterized in that the deflection force depends on the deflection direction by a factor of two. Different deflection forces result in different bending of the stylus 2 during the measuring process. This is discussed in a magazine "Technisches Messen tm" (Technical Measurements), 1979, Issue 2, in an article "Determination of Measuring Uncertainty of Three Dimensional Scanning Systems."

With a three-point support, the effort necessary for the deflection of the stylus 2 or the measuring plate 10 will be the same for all directions. However, the multipliers, on the basis of which the necessary effort is determined, change in an unfavorable case by factor of two.

Therefore, the deflection path, which is determined based on a lever principle, is large, and the necessary force is small, or the deflection path is small, and the necessary force large.

In order to retain a uniform ratio over the entire 360°, i.e., in order to obtain the same sensing characteristics in all direction, the same deflection paths of the tracer tip 11 should be achieved in all of the directions.

The deflection path is determined as a path described by the tracer tip 11 from the moment it contacts the measuring object (the workpiece O) until the moment a sensing signal is generated by the sensing element 7, 8 and 9.

The deflection paths $S_R$ consist of several partial paths, namely, of a bending path $S_V$ and the tripping path $S_A$. Before the stylus 2 is tilted from its initial position 14/16 until the tip 11 contacts the object O during the measuring process, the stylus 2 is bent a certain amount which depends on the scanning forces $F_1$ and $F_2$.

The sensing element 7, 8, 9, as shown in FIG. 1 and 2, is located above the plane in which support points 14/16 lie. During the measuring displacement of the stylus 2 along the object O, the measuring plate 10 will be tilted from its initial plane, which lies parallel to the support plane 14/16, and the lens system 9, which is located in the measuring plate 10, will be so displaced that the sensing element will generate a deflection signal. The amount of displacement of the lens system 9 necessary for generating a deflection signal, is constant for the embodiment shown and is designated as a stroke $l_5$.

Figure 3:
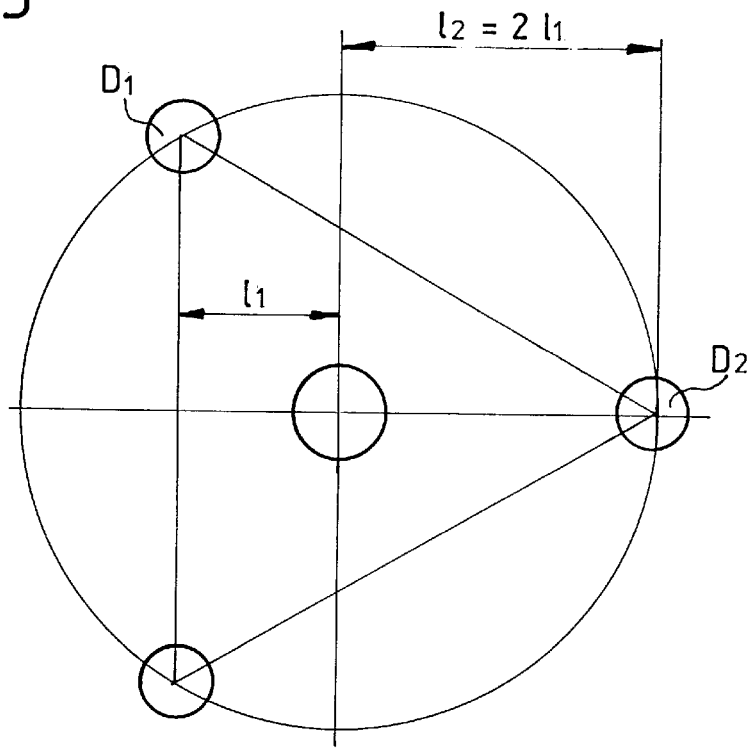
FIG. 3 is another principle diagram of a multi-coordinate touch probe according to the present invention.

Because of the used support geometry, the rotational axes $D_1$ and $D_2$ are spaced a different distance from the axis of the stylus 2. These relationships are also shown in FIG. 3, where the distance between the stylus axis and the axis $D_1$ is designated with $l_1$ and the distance between the stylus axis and the axis $D_2$ is designated with $l_2$, with $l_2 = 2l_1$.

Figure 4:
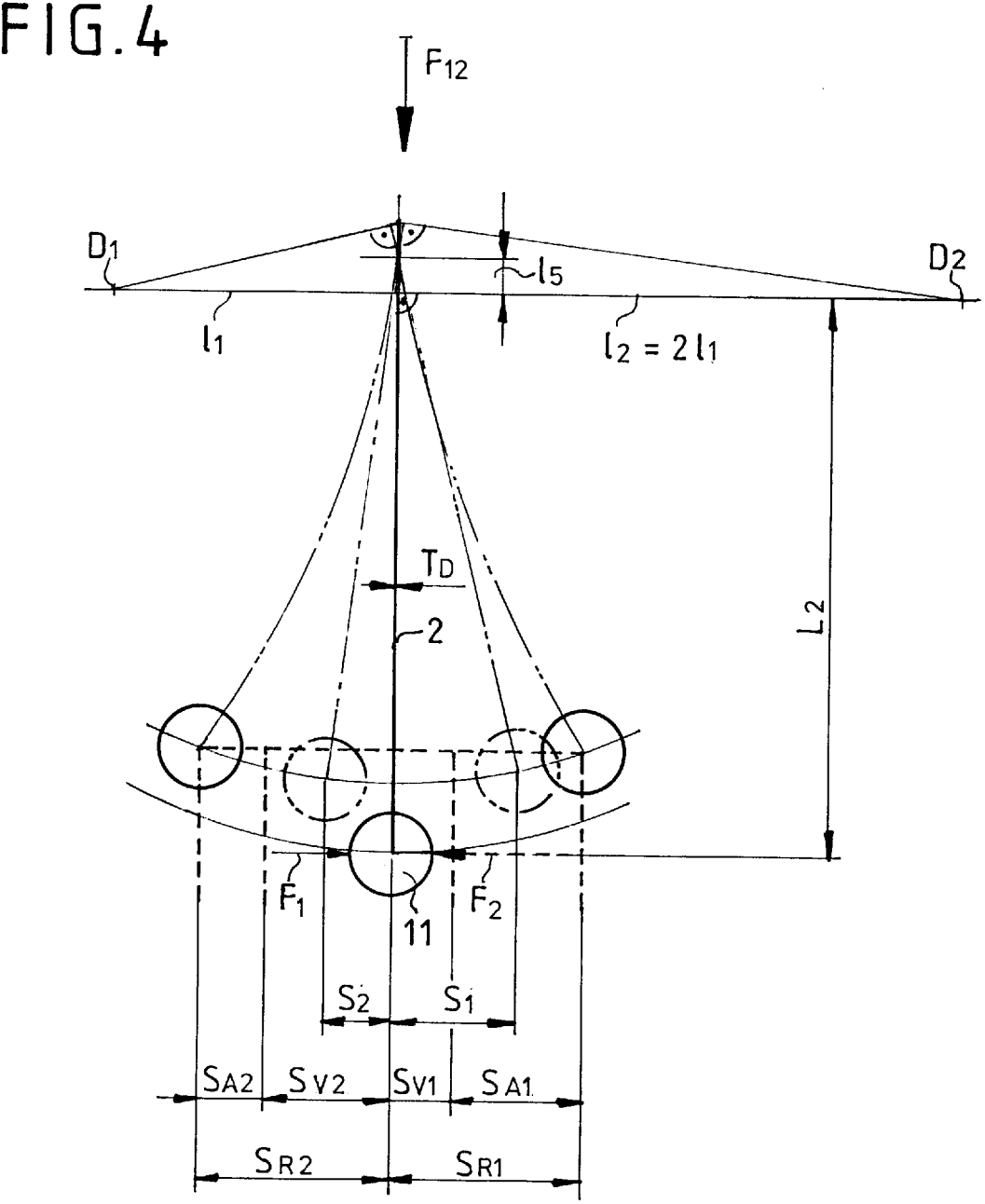
FIG. 4 is a development diagram of a multi-coordinate touch probe according to the present invention.

To provide the sensing elements 7, 8, 9 with the same stroke $l_5$, the tracer tip 11 of the stylus 2, upon tilting about the axis $D_1$, must deflect by a distance $S_1$ (the position of the tracer tip (FIG. 4) is shown by dash-dot lines)); the deflection of the tip 11, upon tilting about the axis $D_2$, should be a distance $S_2$. Thus, the paths $S_1$ and $S_2$ are inversely proportional to distances $L_1$ and $L_2$, with the $S_1$ being twice as large as $S_2$. This relationship is maintained when completely rigid structural elements are used.

In order to deflect the stylus 2 or its tracer tip 11 by above-mentioned distances $S_1$ and $S_2$, different forces $F_1$ and $F_2$ are necessary, which would be inversely proportional to paths $S_1$ and $S_2$.

Different forces $F_1$ and $F_2$ would cause different bending of the stylus 2. Because, as it has already been explained above, there is a linear relationship between the measuring force and the bending of the stylus 2, the bents $Sv_1$ and $Sv_2$ are proportional to the forces $F_1$ and $F_2$.

The tripping paths $S_{A1}$ and $S_{A2}$ correspond to the paths $S_1$ and $S_2$, with the completely rigid structural elements.

To eliminate the direction dependant characteristics, the deflection paths $S_{R1}$ and $S_{R2}$ should be equal. This means that the tracer tip 11 of the stylus 2 should always be displaced by the same amount, independent of the measuring direction, to provide for the stroke $l_5$ as a result of which the sensing device 7, 8, 9 generates a sensing signal.

Because of the geometrical arrangement of the support points 14/16, i.e., because of the position of the stylus 2, the tripping paths $S_{A1}$ and $S_{A2}$ are different (they correspond to paths $S_1$ and $S_2$ and, therefore, are inversely proportional to the given distances $l_1$ and $l_2$), the bent paths $S_{V1}$ $S_{V2}$ should compensate the difference between the tripping paths $S_{A1}$ and $S_{A2}$. The deflection paths $S_{R1}$ and $S_{RI}$ must be equal. Therefore, the sums $S_{V1} + S_{A1}$ and $S_{V2} + S_{A2}$ should be equal to each other, i.e., $S_{R1} = S_{V1} + S_{A1} = SR_2 = S_{V2} + S_{A2}$.

To achieve the same paths $S_{R1}$ and $S_{R2}$, among others, the bending of the stylus 2 must be provided for by an appropriate dimensioning of the touch probe. The entire deformation parameters of the assembly stylus 2/support 17 should be so selected that the resulting deflection paths $S_{R1}$ and $S_{R2}$ eliminate the measuring direction-dependent characteristics.

The deformation parameters of the assembly stylus/support include the geometry of the stylus and support, characteristics of the materials used for their manufacture, the module of elasticity of the stylus, inertia torque of the stylus, the resetting or return force necessary to achieve flattening for the pair of tracer tip-workpiece, and other characteristics which may be necessary for achieving a desired measuring precision.

The calculation equations for determining the relationships between distances $l_1$ and $l_2$, stroke $l_5$, paths $S_1$ and $S_2$, tripping paths $S_{A1}$ and $S_{A2}$, bending paths or flexures $S_{V1}$ and $S_{V2}$, resulting deflection paths $S_{R1}$ and $S_{R2}$, length $L_2$ of the stylus 2 and its diameter $T_D$, diameter of the tip 11, movable masses, and the geometrical arrangement of support points 14/16 are obtained from principles of strength of material science, kinematics and, in particular, from lever principle.

To insure obtaining a bending path $S_1$ of the stylus 2, upon tilting about the axis $D_1$, a torque $M_1$ need be produced which would be equal to the product of the force $F_{12}$ by the distance $l_1$, i.e., $M_1 = F_{12} \cdot l_1$.

This torque is equal to the torque obtained from the product of the force $F_1$ by the length $L_2$ of the stylus 2, i.e., $M_1 = F_1 \cdot L_2$.

The flexure $S_1$ is obtained from equations of the strength of materials. Thus, $$S_1 = \frac{l_5 \cdot L_2}{2 l_1} = \frac{F_1 \cdot L_2^3}{3E \cdot \Theta},$$

$$\Theta = \frac{\pi \cdot T_D^4}{64}$$

An example of calculation of the stylus diameter $T_D$ is given below. The following data are given:

Force $F_{12}$=10N
Stylus length $L_2$=60 mm
Distance $l_1$=4 mm
Stroke $l_5$=0.003 mm
Stylus material - steel
Steel module of elasticity, E=210,000 N/mm²
The torque $M_1$ will be
$M_1 = F_{12} \cdot l_1 = 10N \cdot 4$ mm
$M_1$=40 Nmm=0.04 Nm
The flexure will be at $$S_1 = \frac{l_5 \cdot L_2}{2 \cdot l_1} = \frac{.003 \cdot 60}{2 \cdot 4} \text{ mm}$$

$$S_1 = .0225 \text{ mm} \approx 22 \ \mu m$$

This flexure is equal to $$S_1 = \frac{F_1 \cdot L_2^3}{L_2 \cdot 3 \cdot E \cdot \Theta} = .000022 = \frac{.04 \cdot .06^2}{3E \cdot \Theta}$$

$$\Theta = \frac{.04 \cdot .06^2}{3 \cdot .000022 \cdot 210,000,000,000}$$

$$\Theta = .00001 \cdot 10^{-6} \text{m}^4$$

$$\Theta = .00001 \cdot 10^{-6} = \frac{\pi T_D^4}{64}$$

$$T_D = .0038 \text{ m} \approx 4 \text{ mm}$$

That is, with the given data, the stylus diameter will be 4 mm.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A multi-coordinate touch probe for measuring an object comprising:

a stylus having a free end for scanning the object;

support means for supporting the stylus;

means for applying a resetting force to the stylus for retaining the stylus in the support means in a stylus zero position, the stylus being deflectable from the zero position thereof, upon scanning the object, dependent on a shape of the object;

sensor means arranged at an end of the stylus which is opposite to the free end of the stylus for sensing deflection of the stylus from the zero position thereof and for generating a deflection signal, the sensor means including a member displaceable with the stylus, with the deflection signal being generated upon deflection of the stylus, together with the sensor means member, along a predetermined deflection path a length of which is inversely proportional to a force, which causes the deflection of the stylus and which depends on a scanning direction of the stylus with respect to the object, wherein geometrical layout of the support means, geometrical shape of the stylus, characteristics of materials the stylus and the support are made of, and deformation parameters of the stylus and the support are so selected that a noticeable scanning direction-dependent characteristic, which adversely influences the deflection-causing force, is eliminated.

2. A touch probe as set forth in claim 1, where the resetting force-applying means comprises spring means, and wherein the deformation parameters are defined by the resetting force, a module of elasticity of the stylus, and an inertia torque of the stylus.

3. A touch probe as set forth in claim 2, wherein the deformation parameters are determined by a stylus length, a diameter of a stylus tip, a stroke of the sensor means, and masses of the stylus and the sensor member displaceable with the stylus.

* * * * *